(12) United States Patent
Bourdon et al.

(10) Patent No.: US 9,183,759 B2
(45) Date of Patent: Nov. 10, 2015

(54) BRAILLE DISPLAY SYSTEM AND METHOD FOR OPERATING A REFRESHABLE BRAILLE DISPLAY

(71) Applicant: Thomson Licensing, Issy de Moulineaux (FR)

(72) Inventors: Pascal Bourdon, Cesson Sevigne (FR); Francois Le Clerc, Cesson Sevigne (FR); Pierrick Jouet, Cesson Sevigne (FR)

(73) Assignee: Thomson Licensing (FR)

( * ) Notice: Subject to any disclaimer, the term of this patent is extended or adjusted under 35 U.S.C. 154(b) by 95 days.

(21) Appl. No.: 13/717,756

(22) Filed: Dec. 18, 2012

(65) Prior Publication Data
US 2013/0164717 A1  Jun. 27, 2013

(30) Foreign Application Priority Data

Dec. 21, 2011 (EP) ..................................... 11306739

(51) Int. Cl.
*G09B 21/00* (2006.01)
(52) U.S. Cl.
CPC ............ *G09B 21/004* (2013.01); *G09B 21/003* (2013.01)
(58) Field of Classification Search
CPC .... G06F 3/016; G09B 21/001; G09B 21/003; G09B 21/004; G09B 21/005; G09B 21/025
USPC ........................................................ 434/114
See application file for complete search history.

(56) References Cited

U.S. PATENT DOCUMENTS

| | | | | |
|---|---|---|---|---|
| 4,871,992 A * | 10/1989 | Petersen | ..................... | 340/407.1 |
| 5,736,978 A * | 4/1998 | Hasser et al. | ................. | 345/173 |
| 6,776,619 B1 * | 8/2004 | Roberts et al. | ................ | 434/113 |
| 6,827,512 B1 * | 12/2004 | Souluer | ......................... | 400/483 |
| 7,607,097 B2 * | 10/2009 | Janakiraman et al. | ......... | 715/753 |
| 8,059,088 B2 * | 11/2011 | Eid et al. | ....................... | 345/156 |
| 8,210,848 B1 * | 7/2012 | Beck et al. | .................... | 434/112 |
| 8,494,859 B2 * | 7/2013 | Said et al. | ..................... | 704/271 |
| 2002/0003469 A1 * | 1/2002 | Gupta | ......................... | 340/407.1 |
| 2005/0071165 A1 * | 3/2005 | Hofstader et al. | .......... | 704/270.1 |
| 2005/0221260 A1 | 10/2005 | Kikuchi et al. | | |
| 2006/0206833 A1 * | 9/2006 | Capper et al. | ................. | 715/773 |
| 2010/0042690 A1 | 2/2010 | Wall | | |

(Continued)

FOREIGN PATENT DOCUMENTS

DE  4335442  4/1995

OTHER PUBLICATIONS

European Search report dated May 24, 2012.

*Primary Examiner* — Xuan Thai
*Assistant Examiner* — Michael Humphrey
(74) *Attorney, Agent, or Firm* — Jack Schwartz & Associates, PLLC

(57) ABSTRACT

A Braille display system and a method for operating a refreshable Braille display 14 is provided. A string of characters is assigned to a drive signal for specifying the activation or deactivation of a tuple of dots which are raised through holes in a touch and sense surface of the Braille display 14 upon activation and which are retracted upon deactivation. The Braille display 14 is driven by a drive signal which is configured to activate and/or to deactivate the tuple of dots so as to generate a dynamic tactile display of said string of characters. The time dependent characteristic of activation and/or deactivation of the tuple of dots is defined by the string of characters.

8 Claims, 3 Drawing Sheets

(56) References Cited

U.S. PATENT DOCUMENTS

2011/0063208 A1* 3/2011 Van Den Eerenbeemd et al. ............................. 345/156
2012/0214139 A1* 8/2012 Murphy et al. ............... 434/114
2012/0236134 A1* 9/2012 Keyes ............................. 348/62
2012/0319981 A1* 12/2012 Habas ........................... 345/173
2013/0337421 A1* 12/2013 Gerken, III .................... 434/236
2014/0236596 A1* 8/2014 Martinez ....................... 704/235

* cited by examiner

:-)

:-(

;-)

:-D

:-O

:-P

;'(

\,,/(-_-)\,,/

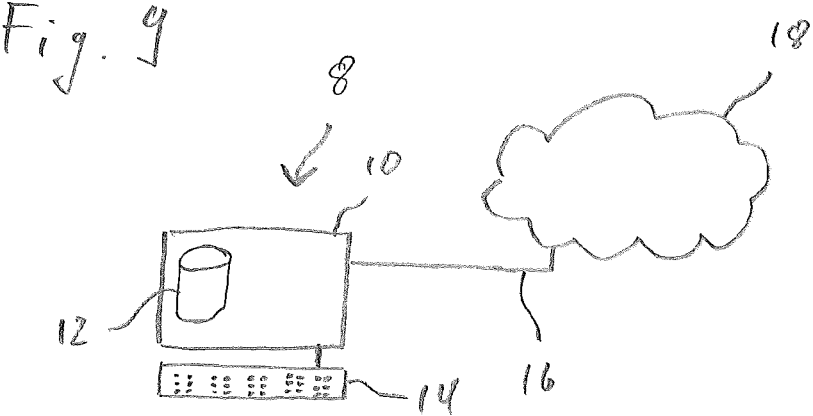

BRAILLE DISPLAY SYSTEM AND METHOD FOR OPERATING A REFRESHABLE BRAILLE DISPLAY

This application claims the benefit, under 35 U.S.C. §119 of EP Patent Application 11306739.1, filed 21 Dec. 2011.

FIELD OF THE INVENTION

The invention relates to a method for operating a refreshable Braille display and further to Braille display system.

BACKGROUND

The Braille code is widely used by blind people to read and write. Devised by the blind Frenchman Luis Braille, the Braille code is written in Braille cells, wherein each Braille cell is made up of six or eight dot positions which are arranged in a rectangle comprising two columns of three or four dots each. Each Braille cell represents a character, a sign or a number according to the commonly known Braille code. Today, different Braille codes or code pages are used to map character sets of different language to the Braille cells. Further, there are different Braille codes which are used for different purposes like mathematics or music.

Braille may be produced using a slate and stylus wherein each dot is created from the back of a page, writing in mirror image by hand. Further, there are Braille type writers such as the Perkins Brailler which produce Braille embossings on a sheet of paper. Modern Braille embossers may be connected to a computer and allow "printing" of Braille characters with computer based word processors.

A beneficial tool for blind people using a computer is a refreshable Braille display. Such a Braille display or Braille terminal is an electromechanical device for displaying Braille characters. Usually, dots are raised through holes in a flat touch-and-sense surface and blind people may recognize the displayed Braille characters by touching and sensing the Braille line which typically comprises 40 or 80 Braille cells.

The refreshable Braille display may be used to read text tactually that is displayed visually on a computer monitor. The refreshable Braille display may be connected to a personal computer via a serial or USB cable and produces a Braille output by help of a plurality of small plastic or metal pins that move up and down to display the Braille characters in the Braille cells of the touch-and-sense surface in the Braille line. However, Braille display systems are limited in that, Braille characters of the common Braille code may be displayed only. In modern communication applications which are available to non-blind people, for example in chat or talk applications, there are further options for communication. For example, there are symbols or pictures which are not a part of the Braille coding system but which are frequently used for communication and which allow summarizing a complex feedback or a mood of the author by help of well known icons or graphical representations. Due to the limited operability of today's Braille systems, this way of communicating is refused to blind people who operate their personal computer using a refreshable Braille display.

SUMMARY

It is an object of the invention to provide a method for operating a refreshable Braille display and a Braille display system having extended display functionality.

In one aspect of the invention, a method for operating a refreshable Braille display is provided. The Braille display comprises a touch-and-sense surface having a plurality of neighboring Braille cells which are suitable for displaying Braille characters. A string of characters of a character encoding system is received. The string of characters is assigned to a drive signal specifying the activation or deactivation of a tuple of dots which are raised through holes in the touch-and-sense surface upon activation and which are retracted upon deactivation. The refreshable Braille display is driven by communicating the drive signal for activation or deactivation of the tuple of dots which are arranged in at least one Braille cell of the Braille display to the Braille display. The drive signal is configured to activate and/or to deactivate the tuple of dots so as to generate a dynamic tactile display of said single string of characters. In other words, a plurality of characters which are arranged in the single string is displayed by a dynamic tactile Braille like sign. The time dependent characteristic of activation and/or deactivation of the tuple of dots is defined by the string of characters. In other words, the string of characters is indicative to the time dependent characteristic of activation and/or deactivation of the tuple of dots.

By help of the method according to aspects of the invention, users of refreshable Braille displays are provided with an extended functionality of this refreshable Braille display. There is an extended functionality in that, dynamic "Braille-like-characters" may be displayed at the refreshable Braille display. This opens up a pathway for blind people to communicate in a more complex way of communication which is not restricted to the Braille code and the typical Braille characters.

According to an aspect of the invention, the character encoding system is the ASCII or Unicode system. Further, the characters of the string of characters which are encoded in said system represent an emoticon. The term "emoticon" is commonly used for strings of characters like ":-)", ":-(", ";-)" etc. and is used within this sense within the context of this specification. The most prominent emoticon is the ":-)" and indicates a joke or an ironic phrase of the writer. Emoticons are widely used in electronic communication to express emotions of the writer or to indicate ironic content to prevent misunderstanding by the reader. By help of the method according to aspects of the invention, users of the Braille code are offered to communicate by help of emoticons which will be translated to a dynamic tactile Braille like character at the touch-and-sense surface of the refreshable Braille display.

It is further advantageous if the string of characters is assigned to a drive signal for activation or deactivation of a plurality of tuples of dots, wherein these tuples are for displaying a dynamic tactile Braille like character. The dynamic tactile display representing the string of characters is performed by sequentially activating or deactivating the dots of a respective one of the plurality of tuples. Advantageously, the use of a plurality of tuples of dots allows communicating using emoticons having a more complex tactile analogon.

According to another aspect of the invention, a time gap between activation or deactivation of a first tuple of dots and activation or deactivation of a second tuple of dots is defined by the string characters. In other words, the dynamic tactile display which is represented by the dynamic display of a plurality of tuples of dots may be fast or slow as a function of the string of characters. For example, an emoticon indicating a bad mood may be displayed on the Braille display by a fast change between the two tuples of dots while an emoticon indicating happiness may be represented by a tactile sign having a slow change between the tuples of dots, i. e. a great time gap between activation and/or deactivation of the first and second tuple of dots.

The emoticons which are represented by a string of characters, preferably in the ASCII code are translated into a Braille like sign which varies over time. A further extension of the Braille based communication may be provided according to another aspect of the invention wherein a speed of motion of the dots during activation or deactivation of the at least one tuple of dots is defined by the string of characters. For example, an emoticon indicating affection may be displayed by slow and smooth motion of the dots of the refreshable Braille display. In contrast, an emoticon which typically represents anger or aggressive feelings may be translated into a fast and abruptly changing tactile sign. This may be performed by raising and retracting the dots with a high speed of motion.

The method according to aspects of the invention may be implemented by provision of a database comprising a plurality of strings of characters of predetermined emoticons. For example, the typical emoticons frequently used in Europe and the United States may be a part of this database. However, Asian users prefer different types of emoticons, for example: "(^_^)" or "(^.^)" which are used by male and female users, respectively, to indicate laughing. These frequently used emoticons may be included into the database too. Upon reception of a string of characters, the database is searched and if a match is found, a predetermined set of parameters for activation or deactivation of the at least one tuple of dots is assigned to the respective string of characters, for example to a certain emoticon. The received string of characters is allocated to this predetermined set of parameters for generation of a drive signal for activation or deactivation of the tuple of dots so as to generate a dynamic tactile display of this single emoticon.

According to an embodiment of the invention, the dynamic tactile display of the string of characters, for example the display of an emoticon, is restricted to a single Braille cell. Advantageously, this will increase the number of displayable characters at the refreshable Braille display which is a crucial aspect because of the low number of Braille cells in a refreshable Braille display (i. e. typically 40 or 80 characters may be displayed only).

According to another aspect of the invention, a Braille display system comprising a control unit, a storage device and a refreshable Braille display is provided. The refreshable Braille display has a plurality of neighboring Braille cells which are suitable for displaying Braille characters. The control unit is configured to scan entries of a database which is stored on the storage device for a received string of characters upon reception of said string of characters of a character encoding system. Preferably, the control unit is configured to receive a string of characters which are encoded in the ASCII or Unicode system and further, the string of characters represents and emoticon. Upon detection of a matching entry in the database, a set of parameters is requested from the database and a drive signal is generated based on this set of parameters. The drive signal is for driving at least one tuple of dots of at least one Braille cell of the refreshable Braille display. For driving the refreshable Braille display, the generated drive signal is communicated to the Braille display for activation or deactivation of the tuple of dots. The control unit is configured to generate a drive signal for activation and/or deactivation of the tuple of dots so as to generate a dynamic tactile display of said string of characters, for example to generate a dynamic tactile display of an emoticon. The time dependent characteristic for activation and/or deactivation of the tuple of dots is specified by the requested set of parameters which is stored in the database.

Same or similar advantages which have been already mentioned with respect to the method according to aspects of the invention apply to the Braille display system in a same or similar way and therefore, these advantages will not be repeated.

BRIEF DESCRIPTION OF DRAWINGS

Further aspects and characteristics of the invention ensue from the following description of preferred embodiments of the invention with reference to the accompanying drawings, wherein FIG. 9 is a simplified Braille display system.

DETAILED DESCRIPTION OF AN EXAMPLE EMBODIMENT

Figure 1:
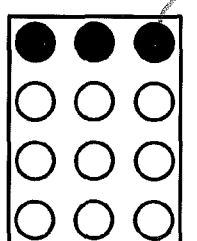
FIGS. 1 to 8 are simplified diagrams each showing a single stage of a dynamic tactile emoticon, wherein the depicted single stages are designated for subsequent display at a refreshable Braille display
Figure 1:
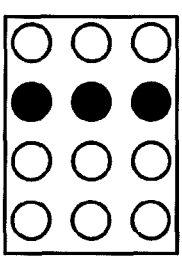
Figure 1:
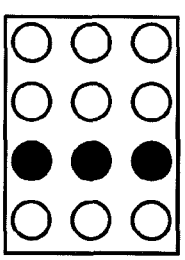
Figure 1:
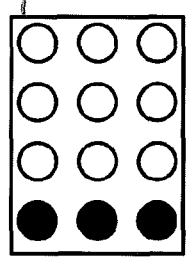

FIG. 1 is a simplified diagram showing four different stages of a dynamic tactile display of the emoticon ":-)". A status of a single Braille cell 2 is shown for every stage of the dynamic Braille like tactile sign. By way of an example only, the dynamic tactile sign is restricted to a single Braille cell 2. In FIG. 1 and the subsequent FIGS. 2 to 8 only some of the Braille cells 2 are given reference numerals for clarity reasons only. The same applies to full circles 4 which indicate active dots which are raised through holes in a touch-and-sense surface of a refreshable Braille display. Hollow circles indicate inactive dots 6 of the Braille cell 2. These dots 6 are retracted and may not be sensed by the blind reader. By way of an example only, a 3×4-dot Braille cell 2 is used for the embodiments of FIGS. 1 to 8. However, the embodiments may be transferred to 3×3-dot Braille cell 2 very easily.

According to the embodiment in FIG. 1, the tactile emoticon ":-)" is represented by four tuples of dots which are displayed subsequently in the Braille cell 2. The first tuple comprises three active dots 4 in the first line and is shown on the left (T=0). Continuing from left to right, the second tuple of dots comprises three active dots 4 in the second line of the Braille cell 4 (T=1). The third and fourth tuple of dots comprises three active dots in the third and fourth line of the 3×4-dot Braille cell 2, respectively (see T=2 and T=3). For dynamic tactile display of the emoticon ":-)", the four tuples are activated subsequently as it is indicated by the four stages showing the status of the Braille cell 2 at T=0, T=1, T=2 and T=3 in FIG. 1. The Braille reader is provided with tactile information of a horizontal line in a single Braille cell 2, wherein this horizontal line moves downwards in time. This movement may be repeated several times or may be displayed in an endless loop.

According to another embodiment of the invention, because the emoticon ":-)" stands for happiness, the respective tuples of dots may be activated and deactivated with a slow speed of motion for raising and retracting the respective dots so as to provide a tactile experience which is smooth and gentle to the reader.

Figure 2:
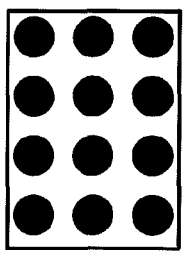
Figure 2:
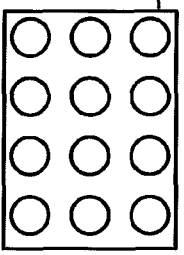
Figure 2:
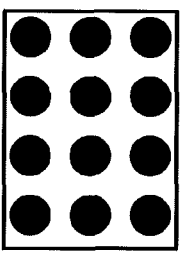
Figure 2:
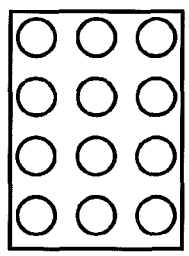

FIG. 2 is a further simplified diagram showing the single stages for dynamic display of the emoticon ":-(", according to another embodiment of the invention. This emoticon typically indicates a bad mood or feeling and accordingly a harsh and not very gentle tactile experience shall be generated. All dots of the Braille cell 2 are activated at the same time (T=0) and deactivated subsequently (T=1). The speed of motion for raising and retracting the dots may be fast and abrupt in order to indicate anger or a bad mood. The pattern may be repeated very fast in order to underline or emphasize the emotion which is typically indicated by the emoticon. The pattern of T=0 and T=1 may be repeated and accordingly all dots of the Braille cell 2 will be raised at T=2 and retracted at T=3. Accordingly, the dynamic display of the emoticon ":-(" comprises two tuples of dots, a first tuple of dots comprises the state: "all dots of the Braille cell 2 active" and the second tuple comprises "all dots of the Braille cell 2 deactivated".

Figure 3:
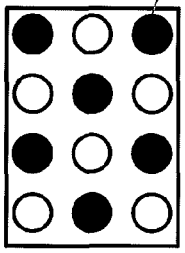
Figure 3:
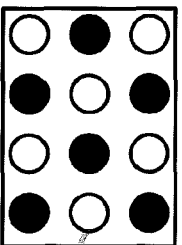
Figure 3:
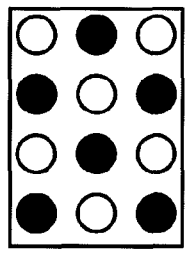

FIG. 3 is a simplified diagram showing the different stages for a tactile coded emoticon ";-)". According to this embodiment, the two tuples of dots shown at T=0 and T=2 and at T=1 and T=3, respectively, are applied. The activated dots 4 and the deactivated dots 6 are inverted at subsequent steps of the dynamic display of said emoticon. The emoticon ";-)" represents to twinkle with one's eyes and accordingly, the time gap between display of the two tuples of dots may be rather fast, for example like a typical eye blink.

Figure 4:
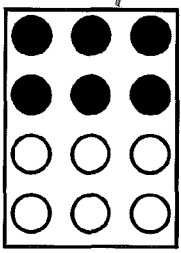
Figure 4:
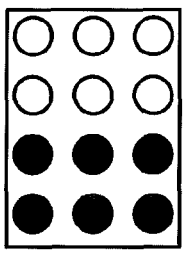
Figure 4:
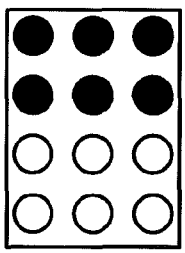
Figure 4:
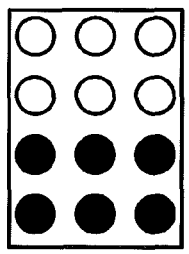

A further simplified diagram of single stages of a dynamic tactile emoticon is shown in the embodiment of FIG. 4. The emoticon ":-D" is represented by two tuples of dots, shown at T=0 and T=2 and at T=1 and T=3, respectively. The emoticon indicates laughing out loud and accordingly, the speed of motion for raising and retracting the tuples of dots in the Braille cell 2 may be a shaking or rattling movement in order to give a tactile representation of the respective emoticon.

Figure 5:
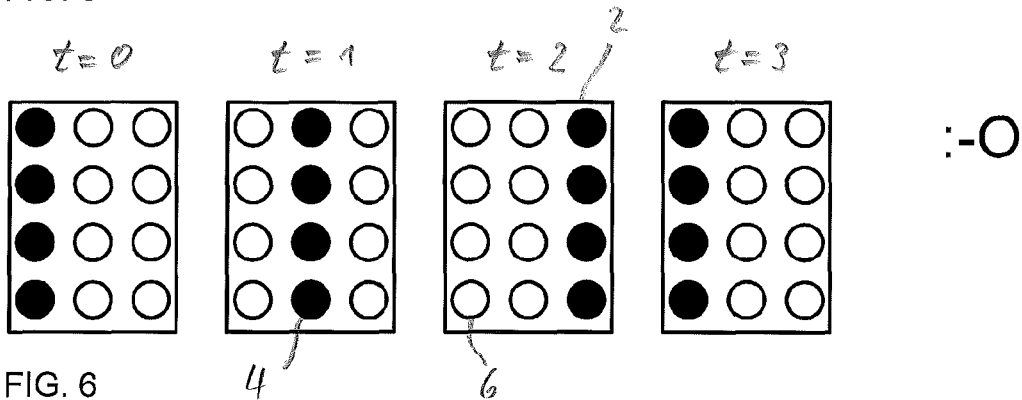

Further simplified diagrams showing single stages of a dynamic tactile encoded emoticon ":-O" are shown in FIG. 5. The dynamic representation of the emoticon ":-O" comprises three tuples of dots which are shown at T=0, T=1 and T=2. The Braille reader may sense a vertical line moving from left to right within a single Braille cell 2. Again the tactile emoticon may be displayed in an endless loop and accordingly, at T=3, the dynamic tactile display starts again with a display of the first tuple of dots known from T=0.

Figure 6:
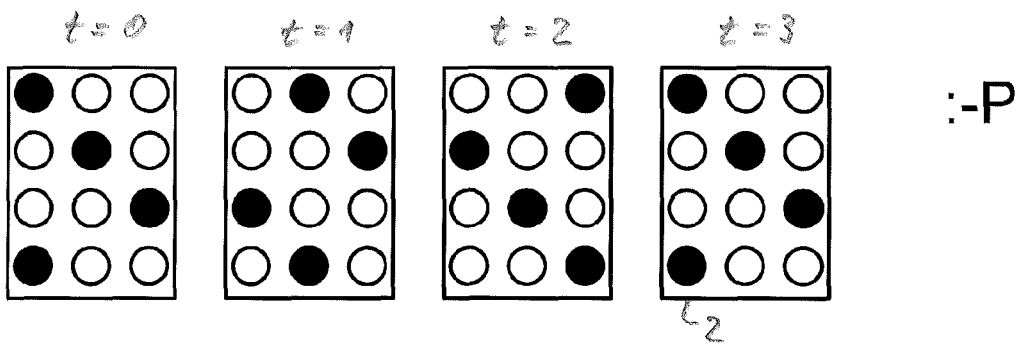
Figure 7:
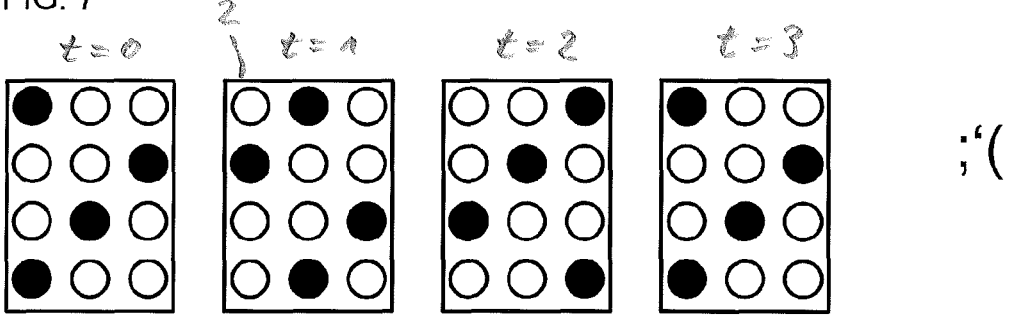
Figure 8:
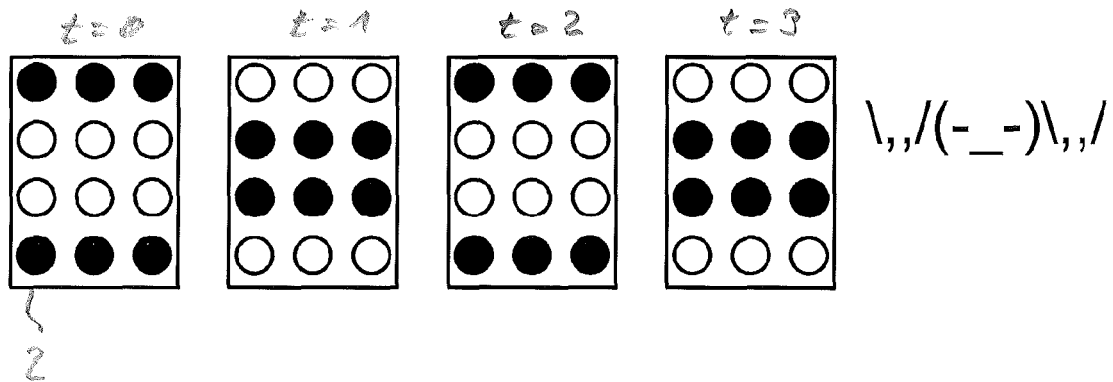

In FIG. 6, there is a plurality of simplified diagrams showing single stages of a dynamic tactile encoded emoticon ":-P". This dynamic tactile display of the emoticon ":-P" comprises three tuples of dots shown at T=0, T=1 and T=2. The Braille reader is provided with a tactile experience of two declining lines moving upwards from the lower left corner to the upper right corner of the Braille cell 2. In the Braille cell 2 at T=3, the tuple known from T=0 is displayed again and the pattern is repeated. A further dynamic tactile display of an emoticon is shown in the embodiment of FIG. 7, wherein the emoticon ";'(" is displayed by providing the reader with a tactile experience of two inclining lines moving downwards from the upper left corner to the lower right corner of the Braille cell 2. This emoticon is displayed by help of three tuples of dots shown at T=0, T=1 and T=2. The emoticon ";'(" represents crying and accordingly there may be a great time gap between display of the single tuples of dots and a slow speed of motion for raising and retracting the respective dots.

According to the embodiments in FIGS. 1 to 7, emoticons which are typically known in Europe and the United States are translated into tactile dynamic signs. However, there is a plurality of frequently used emoticons which are rather uncommon in Europe but which are very well known for example in Asia. One example is: "\,,/(-_-)\,,/" which is frequently used in Japan. This emoticon represents "keep on rocking . . . " and may be encoded by help of the sequence of stages shown in FIG. 8. Two different tuples of dots which are shown at T=0 and T=2 and at T=1 and T=3 may be used for tactile encoding of this emoticon. Because the feeling which is represented by "\,,/(-_-)\,,/" indicates the mood for making party, the speed of motion of the dots may be fast and the time gap between activation and deactivation of the different tuples may be low.

FIG. 9 is a simplified Braille system 8 comprising a processing unit 10 having a data storage device 12. A refreshable Braille display 14 is connected to the processing unit 10 which may be a personal computer or the like. A string of characters, for example the ASCII code ":-)" may be received at the control unit 10 via a link 16 connecting the Braille system 8 to a communication network, for example to the internet 18. The string of characters is compared to a plurality of predetermined strings of characters, for example to a database of frequently used emoticons, which is stored at the data storage device 12. Upon detection of a matching string of characters, a set of predetermined parameters which is assigned to the respective entry of the emoticon in the database is extracted from the database and a control signal for driving the refreshable Braille display 14 is generated by the control unit 10. A Braille reader may communicate with other persons via the internet 18 using the known Braille code. The Braille system 8 according to the embodiment of FIG. 9 provides the Braille reader with an emoticon functionality when reading messages at the refreshable Braille display 14.

Although the invention has been described hereinabove with reference to specific embodiments, it is not limited to these embodiments and no doubt further alternatives will occur to the skilled person that lie within the scope of the invention as claimed.

The invention claimed is:

1. A method for operating a refreshable Braille display comprising a touch-and-sense surface having a plurality of neighboring Braille cells which are suitable for displaying Braille characters, the method comprising:
    a) receiving a string of characters of a character encoding system,
    b) assigning the string of characters to a drive signal specifying an activation or deactivation of a tuple of dots which are raised through holes in the touch-and-sense surface upon activation and retracted upon deactivation, and
    c) driving the refreshable Braille display by communicating the drive signal for activating or deactivating the tuple of dots, which are arranged in at least one Braille cell of the Braille display,
    wherein the string of characters represents an emoticon, and the drive signal is configured to at least one of activate and deactivate the tuple of dots to generate a dynamic tactile display of said string of characters, a time gap between the activation or deactivation of the tuple of dots and at least one of activation and deactivation of a subsequent tuple of dots being defined by an emotion related to the emoticon represented by the string of characters, and a speed of motion of the dots during at least one of activation and deactivation within each tuple of dots being defined by an emotion related to the emoticon represented by the string of characters.

2. The method of operating a refreshable Braille display according to claim 1, wherein the dynamic tactile display of said string of characters is restricted to a single Braille cell.

3. The method of operating a refreshable Braille display according to claim 1, wherein the character encoding system is an ASCII or Unicode system and characters of the string of characters are encoded in said system.

4. The method of operating a refreshable Braille display according to claim 1, wherein the string of characters representing the emoticon is compared to entries in a database comprising a plurality of strings of characters of predetermined emoticons assigned to sets of parameters for one of activation and deactivation of the tuple of dots, and wherein upon matching of the received string of characters with a predetermined string of characters, the received string of characters is allocated to the set of parameters of the drive signal for one of activation and deactivation of the tuple of dots so as to generate a dynamic tactile display of said single emoticon.

5. A refreshable Braille display system comprising a control unit, a storage device and a refreshable Braille display having a plurality of neighboring Braille cells suitable for displaying Braille characters, wherein the control unit is configured to
 a) scan entries of a database stored on the storage device for a received string of characters upon reception of the string of characters of a character encoding system, wherein the string of characters represents an emoticon, and if a matching entry is detected:
 b) request a set of parameters from the database and generate a drive signal based on the set of parameters, for driving at least one tuple of dots of at least one Braille cell, and
 c) drive the refreshable Braille display by communicating the generated drive signal for activation or deactivation of the at least one tuple of dots to the Braille display, wherein the control unit is configured to generate a drive signal for at least one of activation and deactivation of the tuple of dots which is configured to generate a dynamic tactile display of said string of characters, and wherein the requested set of parameters specifies a time gap between the activation or deactivation of a first of the at least one tuple of dots and the activation or deactivation of a subsequent one of the at least one tuple of dots being defined by an emotion meaning of the emoticon related to the string of characters, the requested set of parameters specifying a speed of motion of the dots during at least one of activation and deactivation of the at least one tuple of dots which is defined by an emotion related to the emoticon represented by the string of characters.

6. The system according to claim 5, wherein the dynamic tactile display of said string of characters is restricted to a single Braille cell.

7. The system according to claim 5, wherein the character encoding system is an ASCII or Unicode system and characters of the string of characters are encoded in said system.

8. The system according to claim 5, wherein the scan of entries compares the string of characters representing the emoticon to the entries in the database comprising a plurality of strings of characters of emoticons assigned to sets of parameters for one of activation and deactivation of the tuple of dots, and wherein upon matching of the received string of characters with a string of characters, the received string of characters is allocated to the set of parameters of the drive signal for one of activation and deactivation of the at least one tuple of dots to generate a dynamic tactile display of said single emoticon.

* * * * *